United States Patent Office 3,452,419
Patented July 1, 1969

3,452,419
METHOD OF MAKING A TUBULAR WELDING WIRE OF WELDING ROD ENCLOSING A CORE COMPOSED OF POWDERED CONSTITUENTS
Lars Hilding Hillert, Goteborg, Sweden, assignor to Elektriska Svetsningsaktiebolaget, Goteborg, Sweden, a corporation of Sweden
No Drawing. Filed Sept. 7, 1965, Ser. No. 485,594
Claims priority, application Sweden, Sept. 7, 1964, 10,695/64
Int. Cl. B22f 3/24; B23k 35/06
U.S. Cl. 29—420.5     5 Claims

ABSTRACT OF THE DISCLOSURE

A method of making a tubular welding wire or welding rod enclosing a core composed of powdered constituents, particularly an arc welding electrode, comprising the steps of shaping a metal strip into a trough, depositing in said trough a powdered or granular composition containing a minor proportion of an inorganic bonding agent the melting point of which in the anhydrous state is lower than 550° C., submitting the strip to one or more rolling and/or drawing operations to shape the strip into a closed tube firmly enclosing the powdered composition, and heating said tube to a temperature not exceeding 550° but sufficient to melt the bonding agent.

---

This invention relates to a method of making a tubular welding wire or welding rod enclosing a core composed of powdered constituents, particularly an arc welding electrode, which comprises the steps of shaping a metal strip into a trough, depositing a powdered composition in said trough, and submitting the strip to one or more rolling or drawing operations to shape the strip into a closed tube having a predetermined cross-sectional shape and size. Methods of this kind are described in, for instance, the U.S. patent specification No. 1,629,748 and the British patent specification No. 807,646. The powdered composition may contain substances from one or more of the following groups: Alloying agents, deoxidizing agents, fluxing agents, slag-forming agents, gas-forming agents and arc stabilizing or electron emitting agents.

Tubular welding wires or rods of the kind referred to are used in gas welding and in arc welding with non-consumable electrode (carbon arc welding and TIG welding, as well as in the electro-slag welding process (ES welding) and the consumable electrode welding process, in which last-mentioned processes the tubular wire or rod does itself constitute the consumable electrode. In automatic or semi-automatic consumable-electrode welding the wire is usually supplied as a coil, while in manual welding usually rod-shaped electrodes are employed. The wire or rods may be either bare or coated.

With the tubular wires or rod referred to, it is important to prevent material from dropping out at the electrode tip and to prevent voids from forming within the electrode. To secure this result it has been suggested to submit the core material to a high degree of compaction in the course of the manufacture, in order to convert it into a virtually solid body. This method does, however, not always secure the desired result. Also, it imposes particular restrictions on the manufacturing process. It has also been suggested to mix the powdered material with a liquid bonding agent, for instance a sodium silcate solution, to a paste and to deposit or extrude a string of said paste in the trough-shaped strip. This method introduces, however, other complications.

The invention has for its principal object to provide an improved method of manufacturing a tubular welding wire or rod in which the core is firmly bonded or anchored to the tubular sheath while the disadvantages of the known methods are avoided.

The invention, which is principally concerned with iron and steel arc welding electrodes, comprises a method of making a tubular welding wire or welding rod enclosing a core composed of powdered constituents, particularly an arc welding electrode, said method comprising the steps of shaping a metal strip, particularly a steel strip, into a trough, depositing in said trough a powdered or granular composition containing a minor proportion of an anorganic bonding agent the melting point of which in the anhydrous state is lower than 550° C., submitting the strip to one or more rolling and/or drawing operations to shape the strip into a closed tube having a pre-determined cross-sectional shape and size, and heating said tube to a temperature not exceeding 550° C. but sufficient to melt the bonding agent. The use of a temperature not exceeding 550° C. ensures that no lowering of the hardness or strength of the wire or rod results from the heat treating operation.

In the preferred mode of carrying out the invention, all of the constituents making up the powdered composition, including the powdered bonding agent, are substantially anhydrous. As in this case no steam, or a very small volume of steam only, is formed during the heating of the powder core, the edge portions of the metal strip forming the tube may be allowed to overlap, resulting in a gas-tight or substantially gas-tight joint. The method according to the invention also allows, however, the use of a powdered composition in which the bonding agent and/or other constituents of the composition contain some water. In this case it is preferable to shape the tube in such away that the edges of the strip abut without overlapping, resulting in a somewhat leaky joint equivalent to a narrow gap or slit through which the steam formed during the heating process may escape. For well-known reasons, the finished product as a rule has to be anhydrous or substantially anhydrous.

As an example of a bonding agent suitable for the method according to the invention, chromium trioxide ($CrO_3$) may be mentioned. Said compound has a melting point of about 196° C. The wire or rod having a core containing chromium trioxide is preferably heated to a somewhat higher temperature, for instance in the range 200 to 250° C., preferably to about 220° C. It is possible to employ a more or less hydrated form of $CrO_3$, for instance powdered chromic acid ($H_2CrO_4$) or a powdered mixture of $CrO_3$ and $H_2CrO_4$. Preferably, however, the chromium trioxide as well as the other constituents of the powder composition should be anhydrous. Under certain conditions the use of chromium trioxide as a bonding agent may cause the weld metal deposited by the welding wire or welding rod to be alloyed with some chromium, particularly when the proportion of chromium trioxide in the core composition is comparatively large and the composition contains a substantial proportion of deoxidizing agents.

At temperatures substantially higher than the melting point of the chromium trioxide the chromium trioxide is successively decomposed into lower oxides and oxygen. At temperatures exceeding about 415°, only chromium oxide ($Cr_2O_3$) is stable. The invention also includes a method in which the tubular wire or rod having a core containing chromium trioxide is heated to a temperature at which the chromium trioxide is wholly or partially decomposed, for instance to a temperature of 450°, in which case the bonding agent present in the finished wire or rod will consist of chromium oxide ($Cr_2O_3$).

Boric oxide is another example of a suitable bonding agent for the method according to the invention. Said compound is stated in the literature to have a melting point of 450° C. Actually it shows no sharp transition between the solid and the liquid states, but rather a continuous decrease in viscosity on increase of temperature. In heating a tubular wire or rod the core of which contains boric oxide, the temperature and the duration of the heat treatment have to be chosen in such a way as to cause the boric oxide thoroughly to wet and surround the solid grains of the powder composition whereby on the subsequent cooling the solidifying boric oxide will effect a strong bond between the grains. The temperature is best chosen within the range of 450 to 550° C.; the preferred heating temperature is about 500° C. The boric oxide in addition to serving as a bonding agent also serves as a flux in the welding process.

The invention includes the possibility of employing boric oxide in a hydrated form such as boric acid ($H_3BO_3$) or condensed boric acid ($HBO_2$ or $H_2B_4O_7$). In that case, the heat treatment conditions should be chosen so as to ensure that no rest of water remains in the core at the termination of the heat treatment.

In a particular mode of carrying out the invention, the powdered composition deposited in the trough-shaped strip consists of grains each of which consists of at least two constituents bonded by a bonding agent. The use of grains of this kind eliminates the risk of segregation to which compounds made up of grains having dissimilar compositions are liable. The bonding agent of the individual grains may, for instance, consist of sodium or potassium silicate. The fusible bonding agent which is to be employed according to the invention for providing a bond between the grains of the core is added to the composition prior to its deposition in the trough-shaped strip. According to another possibility within the invention, the bonding agent present in the individual grains is a fusible compound of the same type as the one employed according to the invention for effecting the bond between the grains, for instance boric oxide or chromium trioxide. In said last-mentioned case it may be superfluous to add an additional proportion of a bonding agent to the powder composition prior to its deposition in the trough. The invention also includes the use of a powdered composition consisting, apart from the powdered bonding agent, entirely or predominantly of grains or granules of a pre-fused compound.

The proportion of bonding agent required in the method according to the invention to some extent depends upon the grain sizes of the powdered solid constituents of the core composition and other factors. Generally, the proportion of bonding agent should not be lower than 1% and not exceed 10% of the weight of the core composition. A proportion of about 5% will be suitable in the majority of cases.

The following illustrative example relates to the manufacture of rod-shaped coated electrodes for depositing a weld metal consisting of austenitic stainless steel.

A strip of mild steel (0.1% of carbon) having a width of 21 mm. and a thickness of 1.2 mm. is continuously shaped into a trough having a rounded bottom by means of a set of profiling rollers and subsequently shaped into a cylindrical tube by means of a set of rollers which bend the edges of the strip inwards to an abutting position. Prior to the closing of the trough the following powdered, dry composition is deposited in the trough:

| | Percent |
|---|---|
| Chromium powder | 65 |
| Nickel powder | 32 |
| Chromium trioxide | 3 |
| | 100 |

The grain sizes of the powder are distributed within the range of 0.08 to 0.4 mm. The proportion of powder is adjusted so as to equal 43% of the weight of the steel strip, or 30% of the combined weight of the steel strip and the powder composition. The tube is then reduced to a diameter of 5 mm. by cold drawing and wound into coils. The coils are heated to 220° C. in a furnace and held 30 minutes at said temperature. After cooling, the tubular wire is straightened by means of a set of straightening rollers and supplied to a wire cutting machine of the type normally used for cutting massive wire, by which the wire is cut into rods having a length of 450 mm. The rods are fed into an electrode press in which they are provided with an extruded coating of any of the types customarily employed for electrodes of austenitic stainless steel, for instance a coating of the anorganic titania base type containing about 30% of titania. The coated electrode is then dried in the usual way. The electrodes thus manufactured have a current carrying capacity far exceeding the one of electrodes having a massive core wire of stainless steel, but behave otherwise in the same way as the usual electrodes.

I claim:

1. A method of making a tubular welding wire or welding rod enclosing a core composed of powdered constituents, particularly an arc welding electrode, comprising the steps of shaping a metal strip into a trough, depositing in said trough a powdered or granular composition containing a minor proportion of an inorganic bonding agent the melting point of which in the anhydrous state is lower than 550° C., submitting the strip to one or more rolling and/or drawing operations to shape the strip into a closed tube firmly enclosing the powdered composition, and heating said tube to a temperature not exceeding 550° C. but sufficient to melt the bonding agent.

2. A method of making a tubular welding wire or welding rod enclosing a core composed of powdered constituents, particularly an arc welding electrode, comprising the steps of shaping a metal strip into a trough, depositing in said trough a powdered or granular anhydrous composition containing a minor proportion of an anhydrous inorganic bonding agent the melting point of which is lower than 550° C., submitting the strip to one or more rolling and/or drawing operations to shape the strip into a closed tube firmly enclosing the powdered composition, and heating said tube to a temperature not exceeding 550° C. but sufficient to melt the bonding agent.

3. A method of making welding rods which comprises the steps of shaping a metal strip into a trough, depositing in said trough a powdered composition comprising a minor proportion of an inorganic bonding agent the melting point of which in the anhydrous state is lower than 550° C., submitting the strip to one or more rolling and/or drawing operations to shape the strip into a closed tube of predetermined cross-sectional size tightly enclosing the powdered composition, heating said tube to a temperature not exceeding 550° but sufficient to melt said inorganic bonding agent, causing the tube to cool down to a temperature below the melting point of the inorganic bonding agent, and cutting the tube into rods by means of a wire cutting machine.

4. A method of making a tubular welding wire or welding rod enclosing a core composed of powdered constituents, particularly an arc welding electrode, comprising the steps of shaping a metal strip into a trough, depositing in said trough a powdered composition comprising a minor proportion of uncombined chromium trioxide, preferably in the anhydrous state, submitting the strip to one or more rolling and/or drawing operations to shape the strip into a closed tube firmly enclosing the powdered composition, and heating said tube to a temperature of at least 196° C., but not above 550° C.

5. A method of making welding wire or welding rod enclosing a core composed of powered constituents, particularly an arc welding electrode, comprising the steps of shaping a metal strip into a trough, depositing in said trough a powdered composition comprising a minor proportion of a substance selected from the group consisting of boric acid and boric oxide, preferably in the anhydrous state, submitting the strip to one or more rolling and/or drawing operations to shape the strip into a closed tube firmly enclosing the powdered composition, and heating said tube to a temperature of at least 450° C. but not above 550° C.

References Cited

UNITED STATES PATENTS

| | | | |
|---|---|---|---|
| 2,697,159 | 12/1954 | Donahey | 148—26 |
| 3,073,948 | 1/1963 | Johnson | 219—145 |
| 1,629,748 | 5/1927 | Stoody | 219—146 |
| 2,720,473 | 10/1955 | Donahey | 219—146 |
| 3,278,815 | 10/1966 | Booe et al. | 317—258 |
| 3,334,975 | 8/1967 | Quaas et al. | 29—504 |

JOHN F. CAMPBELL, *Primary Examiner.*

R. B. LAZARUS, *Assistant Examiner.*

U.S. Cl. X.R.

29—193; 161—225; 219—146; 264—111, 122